July 4, 1967   W. P. CHAPMAN ETAL   3,329,819
OPTIMIZING A PHOTOCELL CONTROLLED ILLUMINATION CONTROLLER
WITH A HEAT RESPONSIVE SOLAR CELL
Filed Sept. 30, 1963

INVENTORS.
WILLIAM P. CHAPMAN
EUGENE M. WEBER
BY
Andrus & Starke
ATTORNEYS

United States Patent Office 3,329,819
Patented July 4, 1967

3,329,819
OPTIMIZING A PHOTOCELL CONTROLLED
ILLUMINATION CONTROLLER WITH A
HEAT RESPONSIVE SOLAR CELL
William P. Chapman and Eugene M. Weber, Milwaukee,
Wis., assignors to Johnson Service Company, Milwaukee, Wis., a corporation of Wisconsin
Filed Sept. 30, 1963, Ser. No. 312,585
16 Claims. (Cl. 250—205)

This invention relates to an optimizing illumination controller wherein both artificial and natural lighting is controlled to maintain a predetermined illumination level or intensity and the natural lighting is further controlled to prevent undue effects of solar heating.

In the illumination control of enclosed working areas such as classrooms and the like, sensing means may be provided to automatically regulate the amount of artificial lighting within the working area to maintain a preselected illumination level. In one system, the light sensing means senses the intensity of the natural lighting and controls the artificial lighting in accordance with the known effect thereof to maintain a predetermined illumination level. Alternatively, the light sensing unit is so placed as to directly sense the illumination level within the room and to control the intensity of the artificial lighting accordingly. Such devices generally provide economy in electric lighting costs. However, in all such systems, the effects of the natural lighting is maintained.

The copending application of Eugene M. Weber entitled Illumination Controller filed on September 30, 1963, Serial No. 312,757 and assigned to a common assignee, discloses an improved illumination controller for controlling both the natural and the artificial lighting to maintain a predetermined intensity and thereby prevent an undesirable variation of the level from the selected level. As set forth therein, if the natural lighting alone raises the intensity above a preselected level, the window covering is increased and the amount of natural light entering the room is thereby reduced. However, natural daylight is transmitted to maintain the desired illumination level. Although such a system provides a highly satisfactory system, the admission of natural daylight under all conditions results in solar heating effects within the enclosure. During the summer months and the like, such natural lighting must be compensated for by air conditioning or the temperature of the room rises above the desired heat comfort level.

The present invention is particularly directed to an optimizing illumination controller which provides normal illumination level control through any suitable means and preferably through a combined lighting and shade control and an overriding heat responsive control which is responsive to the solar heating effect of the natural daylight.

In accordance with this invention, a window shading means is actuated to reduce or completely eliminate the natural lighting whenever the benefit of the natural daylight as an illumination source is outweighed by the undesirable solar heating effect thereof. The window shading or light interrupting means preferably reflects all or a substantial part of the solar heat to the exterior of the lighted area. Interlocking means are provided for automatically switching between a normal illumination level control means and the overriding control means with special means preventing operative disconnection of the normal illumination wherein the enclosure would be subjected to a temporary darkness condition upon returning to the illumination control means. Further, manually controlled or overriding switch means are provided to permit the reversing of the optimizing function whenever solar heating is beneficial.

In a preferred construction of the present invention, a direct conversion solar cell is mounted immediately between the window or other opening through which natural lighting is transmitted and a movable covering shade means for the window. The cell generates a small electrical signal directly in accordance with the radiant energy of the natural lighting. An electroresponsive controller is actuated by the output of the cell to complete the circuit of a cyclically driven switch motor which actuates a plurality of switches interconnected with a normal illumination control means to operatively disconnect the window shading control of the latter and to close the shade means for reflection of the natural lighting and thereby the solar heating effect. The motor is driven through a first cycle in response to a signal from the cell when the solar heat level increases to a predetermined intensity. During this cycle, the switches are actuated to slowly close the shading means and cut out the shade control portion of the illumination control means. The latter also automatically turns on the room lights in accordance with the reduction in the natural lighting occasioned by actuation of the overriding solar heat control means. If the radiant heating decreases by a predetermined amount, the motor is again actuated to complete a second cycle actuating the switches to return the normal illumination controller to complete control. Generally, the room lights will then be on and the illumination controller will be fully satisfied. The present invention momentarily actuates the circuit to simulate an illumination level below the desired intensity whereby the shade means are returned to the fully opened position establishing a temporary excessive level. The controller will then begin to reduce the artificial lighting and if necessary close the shade means to decrease the natural lighting and re-establish the predetermined illumination level. The normal illumination controller is therefore back in full automatic control.

The present invention thus provides an optimum system for controlling the illumination level in an enclosed area subject to natural and artificial lighting wherein undesirable heating effects of the natural lighting are prevented. The system will therefore minimize the operating and initial cost of air conditioning systems as well as provide for minimal electrical lighting costs.

The drawing furnished herewith illustrates the best mode presently contemplated for carrying out the invention and will more fully disclose and explain to those skilled in the art the many advantages and functions of the present invention.

Figure 1:
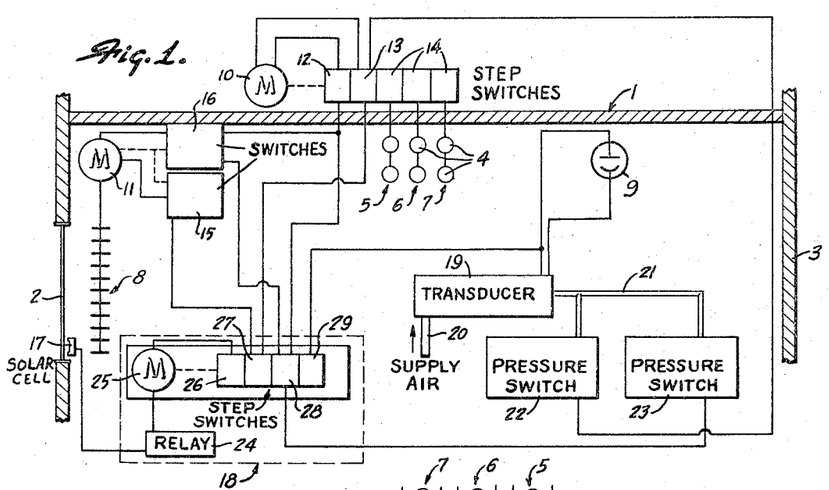
FIG. 1 is a block and line diagram disclosing an optimizing illumination controller incorporating a normal illumination control unit in combination with the solar controlled unit which is the primary subject of this invention.

Referring to the drawing and particularly to FIG. 1, a fragmentary portion of a work area such as a school classroom 1 is shown having a window 2 in the outside wall thereof, an inner wall 3 and a plurality of lamps or individual lights 4 which are secured to the ceiling for artificial illumination of the classroom 1. In the illustrated embodiment of the invention, the lights 4 are arranged in three rows 5, 6 and 7 laterally spaced and extending parallel to the window 2 with row 5 adjacent the window and row 7 adjacent the inner wall 3. A venetian blind 8 is mounted to the inside of the window 2 and is adapted to be opened and closed to increase or decrease the natural lighting, as hereinafter described. The illustrated embodiment of the invention employs a closed loop system having a light responsive or sensitive cell unit 9 mounted on the ceiling of room 1 and interconnected as a part of an illumination level control for selective operation of a lamp control motor 10 and a blind control motor 11.

The light sensitive cell unit 9 may be any known or suitable unit such as one or more self-generating cells which converts light to a current signal in proportion to illumination intensity striking the cell. Further, although a single unit 9 is shown, several spaced cells may be employed in larger rooms with the average output forming the control signal.

Motor 10 is coupled to a switch bank having a limit switch 12, a limit-transfer switch 13 and three light switches 14, one for each of the light rows 5, 6 and 7 for controlling the artificial lighting. Motor 11 is coupled to position blind 8 for controlling the natural lighting and is further coupled to a limit switch 15 and a limit-transfer switch 16.

The motors 10 and 11 are connected in energizing circuits including the limit switches 12 and 15 and transfer switches 13 and 16 and provide interrelated control of the blind 8 and lamps 4 to maintain a predetermined illumination level, as hereinafter described.

In accordance with the present invention, a solar cell 17 or other similar unit which is responsive to the heating effect of the natural lighting of the sun, not shown, is mounted in the room 1 between the window 2 and the blind 8 with the sensitive portion thereof facing the window. The output of the solar cell 17 is coupled to a heat level control unit 18 which is interconnected with the limit and transfer switch units to provide an overriding control of the position of blind 8 in a manner which will close the blind and hold it in a closed position in response to a predetermined solar or radiant energy in the natural light which would otherwise be transmitted through the windows 2.

The illumination level control in the illustrated embodiment of the invention generally corresponds to that of the previously referred to copending application of Eugene M. Weber and includes a transducer 19 having an air input or supply line 20 and an air output or pressure line 21 interconnected to control a pressure switch 22 connected to limit switch 13 of motor 10 and a normally closed pressure switch 23 selectively connected to limit switch 12 of motor 10 or limit-transfer switch 16 of motor 11. The light sensitive cell 9 is connected to the transducer 19 and provides an electrical signal which regulates the interconnection of air supply line 20 to output air line 21 in a manner providing an output pressure signal proportional to and in accordance with the output of the light sensitive cell 9.

Pressure switch 22 is a high pressure switch responsive to increasing pressure occasioned by increasing illumination. Pressure switch 22 is operative to first turn off lights 4 and thereafter close blind 8 if the pressure rises above a preset level. Pressure switch 23 is a low pressure switch and is actuated in response to predetermined decreased illumination to open the blind 8 and thereafter turn on lights 4, if necessary. A null pressure range is provided within which neither switch 22 or 23 is actuated and corresponds to a predesigned illumination range. The pressure switches 22 and 23 are thereby interconnected to actuate motors 10 and 11 to adjust the artificial and natural lighting in a manner providing a preset level of illumination within the room 1. Motors 10 and 11 are interlocked through transfer switches 13 and 16, limit switches 12 and 15 and unit 18 such that the blind motor 11 will be first actuated to control natural illumination but in reducing illumination operates only when the lights 4 are off. Additionally, the heat level control unit 18 of the present invention is interconnected to provide an overriding heat control.

The illustrated control unit 18, as shown in FIG. 1, includes an electroresponsive control 24, identified as a relay, connected to the output of the solar cell 17 for controlling energization and operation of an override motor 25 which is coupled to a series bank of stepping switches including the following. A cycle control switch 26 is interconnected and provides cyclical operation of motor 25. A pair of override switches 27 and 28 is connected to the switches 12, 13, 15 and 16 to close the blind and for operable disconnection of the control from the blind motor 11. Switch 27 disconnects the corresponding limit switch 15 from switch 13 and connects the blind motor 11 to power to close the blind 8. Switch 28 disconnects switch 23 from the limit switch 16 and connects it to the limit switch 12. A reset switch 29 is connected in the circuit of the light sensitive cell 9 to establish proper control by illumination control when the blind motor 11 is reinserted into the control.

The operation of the invention, as shown in FIG. 1, is briefly described, as follows, with the blind 8 initially open and lamps 4 on such that the lamps and the natural lighting are providing the predetermined light intensity desired for room 1. The illumination control is in full automatic control and the cell 9 establishes an electrical output signal indicative of the proper illumination. Transducer 19 is thereby actuated to transmit a pressure signal within the dead or null range between settings of the switches 22 and 23.

As daylight or natural lighting increases, the light intensity increases and causes the output of the cell 9 to increase and the pressure signal from transducer 19 to increase accordingly. At a selected maximum intensity, the pressure increase is sufficient to actuate switch 22 and complete a circuit to motor 10 through the associated limit and transfer switch 13. Motor 10 is energized to rotate in a direction actuating the switches 14 to successively turn off the lamp rows 5, 6 and 7 beginning with row 5 and thereby reduces the illumination level. If the lamps 4 are completely turned off and there is still excessive illumination in the room 1, the output of the cell 9 maintains the operating output pressure signal in line 21 at a level actuating switch 22. The signal is then transferred by the switch 13 through the switch 27 and the limit switch 16 to energize blind motor 11 in a direction to close the venetian blind 8 to further diminish the natural lighting until proper illumination is established and reflected in energization of cell 9.

If the illumination level in room 1 subsequently drops below a predetermined level, the output of the cell 9 is decreased and reduces the output pressure signal at the line 21 below the minimum set pressure for switch 23. This actuates the pressure switch 23 which is connected to switch 28 of unit 18 and thereby to limit-transfer switch 16 to first energize the blind motor 11 to open the blind and to thereafter energize motor 10 through switch 12 to turn on the lamps 4, beginning with row 7 adjacent the inner wall 3 and moving outwardly to the rows 6 and 5.

The above illumination control is provided only if the solar heating of the natural lighting is below a selected intensity. If the solar heating increases above a selected level, the output of solar cell 17 energizes the electroresponsive control of unit 18 which energizes motor 25. The latter motor operates through a cycle and stops as a result of operating cycle control switch 26. During the cycle, switches 27 and 28 are actuated and establish circuits through limit switch 15 to close the blind 8 and disconnect the motor 11 from the control and to maintain proper interconnection of the switches 12 and 13 in control. When the solar heating effect decreases to a predetermined level, the output of cell 17 decreases to a predetermined level, and actuates control 24 to again energize motor 25 which completes a reset cycle. Under control of the motor operated switch 26, switches 27 and 28 are returned to the initial position and reconnect the blind motor 11 in the illumination control circuit.

Upon resetting of the unit, the lamps 4 are all on and the blind 8 is closed such that cell 9 is energized and establishes an output holding the illumination control in the dead or null zone. The motor 25 during at least a portion of the last described cycle actuates the switch 29 which is connected to short or bypass cell 9 for a selected period during which time the control is actuated to open the venetian blind 8.

The cell 9 is then energized by the combined illumination of the natural and artificial lighting. Normally, the illumination will be excessive and the control will operate as previously described to first turn off the necessary lamp rows 5, 6 and 7, and if necessary, close blind 8 until the desired illumination is created.

Figures 2, 3:
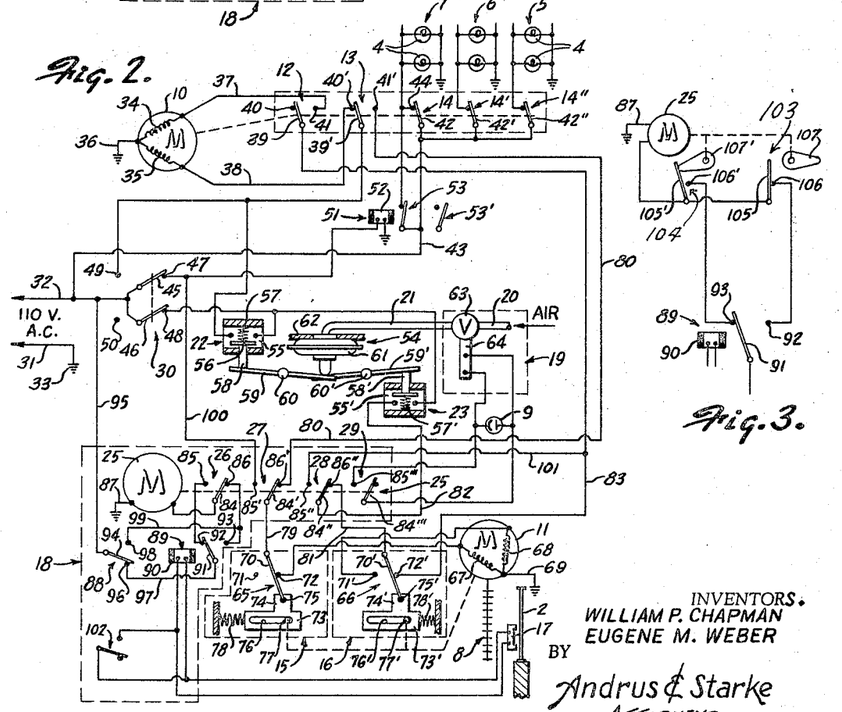
FIG. 2 is a schematic circuit diagram illustrating a preferred construction of the controller shown in FIG. 1.
FIG. 3 illustrates an alternate motor coupled switch construction to insure continued actuation of the system.

A preferred schematic circuit of a system incorporating the elements shown in FIG. 1 is given in FIG. 2 and corresponding elements in FIGS. 1 and 2 are similarly numbered.

In FIG. 2, a main on-off switch 30 of a double-pole, double-throw construction has an automatic position connecting power lines 31 and 32 to the control and an off position connecting motor 10 directly to lines 31 and 32 to turn off lamps 4. For purposes of simplicity, power line 31 is shown as a ground line with the known symbol 33 and the line 32 is shown and hereinafter described as the hot line. In the subsequent circuitry, the grounded side of the several components will be connected to a lead having the conventional ground symbol.

The lamp control motor 10 is shown as a reversible motor having a forward or lamp-on winding 34 and a reverse or lamp-off winding 35 interconnected at one end to each other and to a common ground line 36. Limit switch 12 is shown as a single-pole, double-throw switch connected by a lead 37 with lamp-on winding 34 and to the hot line 32 and limit-transfer switch 13 is shown as a similar single-pole, double-throw switch connected by a lead 38 to the lamp-off winding 35 and to the hot line 32, as hereinafter described. Switch 12 is described in detail with the same elements of switch 13 similarly numbered with superscript primes.

Switch 12 includes a contact arm 39 selectively engaged with a lamp-on contact 40 and a lamp-off contact 41. Contact arm 39 is connected to the blind motor limit-transfer switch 16 as hereinafter described and the contact 41 is connected to the lamp-off winding 34. Contact 40 is a dead contact in switch 12.

Switch 13 has the contact 40' connected to the winding 35 and the contact 41' connected to the limit switch 15 via the control unit 18 and forms a part of the interlock shown in FIG. 1. The contact arm 39' is connected to the pressure switch 22 and to the on-off switch 30 to provide for turning off of the lamps 4 under the action of the illumination control or manual operation of switch 30 when the latter is in the off position through operation of lamp switches 14.

The lamps 4 in the several rows 5, 6 and 7 are connected in parallel within the respective rows. The rows are individually and sequentially controlled by three similar switches 14. Switch 14 for lamp row 7 is described and the corresponding elements of switches 14 for rows 5 and 6 are similarly numbered with a superscript prime and a double prime added respectively to distinguish therebetween.

Switch 14 includes a contact arm 42 connected by a lead 43 to the hot line 32 and a contact 44 connected to the one side of the paralleled lights 4. The opposite side of the row 7 is grounded. In the illustrated position, all rows 5, 6 and 7 of lights 4 are energized. They can be turned off by positioning switch 30 to the off position or by operation of control, as hereinafter described.

Switch 30 is a double-pole, double-throw switch having a pair of mechanically interconnected contact arms 45 and 46 connected to power line 32 and selectively engageable with a pair of automatic contacts 47 and 48 and off contacts 49 and 50.

The off contact 50 is a dead contact whereas contact 49 is connected to contact arm 39' of switch 12 for manually controlling motor 10. When switch 30 is moved to the off position and the lamps 4 are on such that switches 12 and 13 are in the illustrated full line position, motor winding 35 is connected in the following completed circuit across the power lines 31 and 32; beginning at line 32 to the contact arm 45, contact 49, contact arm 39' and contact 40' of switch 13, motor winding 35 and the return on grounded line 36. Motor 10 operates to open associated switches 14 and break the circuit to the respective rows 5, 6 and 7 of lamps 4. The motor 10 also moves contact arm 39' from contact 40' and thereby opens the above energizing circuit for the motor 10 which stops after opening of all switches 14. The proper timed movement of the switches is provided by suitable shaped cams or the like which are coupled to be driven by motor 10 as disclosed in the previously referred to application of Eugene M. Weber.

The automatic contacts 47 and 48 of switch 30 interconnect windings 34 and 35 to the control for illumination and heating control as hereinafter described.

Generally, in larger classrooms and the like it has been found advisable under all normal conditions to maintain the inner row 7 of lights 4 energized. This is provided through an interlock relay 51 having a winding 52 connected between automatic contact 47 of switch 30 and ground such that relay winding 52 is energized whenever the switch 30 is placed in the automatic position. The winding 52 controls a set of normally open contacts 53 connected across the switch 42 for row 7. If desired, additional relay contacts 53' may be provided for installations which may require similar treatment of additional light rows. Although three lighting rows are shown in the illustrated embodiment of the invention, many more rows will often be provided depending on the size of the room and the like.

Relay 51 thus effectively disconnects one or more of the rows of lamps from the control and the action of the lamp motor 10. Rows 5 and 6 are interconnected for control by the motor 10, which in turn is controlled by the action of the pressure switch units 22 and 23.

Referring to FIG. 2, similar pressure switches 22 and 23 are mounted on opposite sides of a single diaphragm actuator 54 which is coupled to respond to the transducer output as modulated by the photocell 9.

Switch 22 is disposed to the left side of the actuator 54 and is schematically shown having a set of contacts 55 connected respectively at one side to automatic contact 48 of switch 30 and at the opposite side to contact arm 39' of switch 13.

A bridging contact member 56 is biased in spaced relation to contacts 55 by a suitable spring 57 and has a depending plunger 58 in the path of the outer end of an operating arm 59. The operating arm 59 is pivotally mounted at the center as at 60 with the opposite end of the arm aligned with and coupled to a bellows or expansion chamber 61 of the actuator 54.

Switch 23 is similarly constructed and mounted to the opposite side of the actuator 54 and corresponding elements are similarly numbered with a superscript prime added. Switch 23 however is mounted beneath the outer end of the arm 59' with a switch plunger 58' projecting upwardly in the path thereof.

The illustrated diaphragm actuator 54 is shown including a mounting frame 62 having a chamber or diaphragm 61 secured to the underside. Air line 21 is connected to the top of chamber 61 which expands and contracts in a vertical direction in accordance with changes in the output pressure signal from transducer 19 and thereby simultaneously pivots operating arms 59 and 59' for operation of switches 22 and 23.

Transducer 19 is shown in FIG. 2 as a conventional electro-pneumatic device or relay 63 connected between lines 20 and 21 and having a control winding 64 connected to the output of the photocell unit 9. The output pressure of the pneumatic device 63 varies with the output of the cell 9 and thus varies the position of the diaphragm 61 in accordance with the output of photocell 9.

The arms 59 and 59' are positioned with respect to the plungers of switches 22 and 23 to provide for a dead or null zone wherein the switches are held in a non-actuated position, as described with respect to FIG. 1.

The central settings of the pressure switches, for example, may be such that the switch 23 is closed at all pressures below 6 p.s.i. (pounds per square inch) whereas the switch 22 is closed at all pressures above 7 p.s.i. Between the 6 and 7 p.s.i., a dead zone is established corresponding to a predetermined illumination level in room 1 as sensed by cell 9.

The switches 15 and 16 are provided to interrelate and control the natural lighting as well as the artificial lighting.

The illustrated switches 15 and 16 respectively include a single-pole, double-throw closed blind switch 65 and a similar single-pole, double-throw open blind switch 66 interconnected to control the blind motor 11. Motor 11 is shown as a reversible motor similar to motor 10 having a closing winding 67 and an opening winding 68 interconnected at one end to a grounded line 69. The opposite ends of the windings 67 and 68 are connected in the circuit by switches 65 and 66 for operation as hereinafter described. Blind switch 65 includes a contact arm 70 engageable with a closed blind contact 71 and an opened blind contact 72. Arm 70 is positioned by a switch cam 73 which is coupled to motor 13 for positioning in accordance with the venetian blind 8. The illustrated switch cam 73 includes a projection 74 pivotally secured as at 75 to contact arm 70 and a cam slot 76 with a small rod 77 slidably disposed therein. A biasing spring 78 is mounted to urge cam 73 to the position engaging arm 70 and contact 72. The rod 77 is coupled to the motor 11, as shown by a dashed coupling line, and is moved proportionately in opposite directions such that its position within the slot is indicative of the position of the venetian blind 8. As shown in FIG. 2, rod 77 engages the right end of slot 76 corresponding to a fully open blind position with contact arm 70 in engagement with contacts 72 and conditions a circuit to winding 67 for closing of the venetian blind 8. When the rod 77 is moved to the opposite end and the blind 8 is fully closed, the rod 77 engages the opposite end of slot 76 and moves it to the left in FIG. 2 and thereby moves contact arm 70 from contact 72 to break the circuit to winding 67 and into engagement with a dead contact 71.

The single-pole, double-throw blind switch 66 is similarly formed with corresponding elements denoted by corresponding numbers with superscript primes added. In switch 66, however, the spring 78' urges the cam 73' in the opposite direction to hold arm 70' engaging contact 71' except when rod 77' is moved to the extreme right corresponding to a fully open blind position. In the latter position, rod 77' positively holds cam 73' to the right and moves contact arm 70' in engagement with contact 72'.

The switch 65 has its contact arm 70 connected by a lead 79 to switch 27 in unit 18 and therefrom by a lead 80 to the contact 41' of switch 13. The contact 71 is a dead contact whereas the contact 72 is connected to the one side of the motor winding 67.

The switch 66 has its contact arm 70' connected by a lead 81 to switch 28 in unit 18 and therefrom by a lead 82 to one side of the contacts 55' of switch 23. Contact 71' is connected to the opening winding 68 of the motor 13 and the contact 72' is connected by a lead 83 to the contact arm 39 of the switch 12 for control of motor 10.

The above described circuit of FIG. 2 provides for controlling the illumination level to a predetermined intensity by regulation of the position of blind 8 and energization of lighting rows 5, 6 and 7 when the heating effect of the natural lighting is not at an undesirable level and switches 27 and 28 are closed to connect the switches 65 and 66 as described above.

In the illustrated embodiment of the invention, the control unit 18 provides the overriding control and a preferred construction particularly adapted for incorporation with the described normal illumination level control is shown in FIG. 2.

Each of the four switches 26 through 29 is similarly a single-pole, double-throw switch and switch 26 will be described with superscript primes added to corresponding elements in the other switches.

Switch 26 includes a contact arm 84 normally disengaged from a contact 85 and normally engaging a contact 86. The contact arm 84 is suitably coupled to the override motor 25 by a rotating cam means engaging arm 84 or the like, not shown, and of a proper configuration to reverse the position of the contact arm with respect to contacts 85 and 86 as presently described.

Motor 25 has its one side connected to a grounded lead 87 and its opposite side connected to the contact arm 84 of switch 26. Contacts 83 and 84 of switch 26 are connected in circuit to hot power line 32 by an on-off switch 88 and the interlocking solar heat responsive relay 89, shown in FIG. 1 in block diagram as element 24.

Relay 89 includes a winding 90 connected to the output of the solar cell 17 and electromagnetically coupled to a contact arm 91 for selective engagement with a normally engaged contact 92 and a normally disengaged contact 93. Contacts 92 and 93 are connected respectively to contacts 85 and 86.

The contact arm 91 of relay 89 is connected to the manually actuated on-off switch 88 which includes a switch arm 94 connected to the hot line 32 by a connecting lead 95. The switch 88 includes an optimize contact 96 which is connected to the contact arm 91 of relay 89 by a lead 97 and a blind closed contact 98 connected by a lead 99 to the relay contact 92 and contact 86 of switch 26. With the on-off switch 88 in the optimize position, power is placed on the relay contact arm 91 and transferred to the motor control switch 26 and particularly contacts 85 and 86 in accordance with the energization and de-energization of the relay winding 90 of relay 89.

Switches 27, 28 and 29 are coupled by suitable cam means or the like to motor 25 and are connected into the control as follows.

Switch 27 has its contact arm 84' connected by the lead 79 to the contact arm 70 of the switch 65 of limit switch 15. The normally disengaged contact 85' of switch 27 is connected by a lead 100 to the contact 47 of the switch 30 for providing power to the closing winding 67 when unit 18 is actuated. The engaged contact 86' of switch 27 is connected by the lead 80 to contact 41' of switch 13 to provide interrelated control of closing winding 67 when unit 18 is not actuated.

Switch 28 has its contact 85'' connected by a lead 101 to lead 83 which in turn interconnects the contact arm 39 of switch 12 to the normally open contact 72' of the limit switch 66 and bypasses motor 11 when unit 18 is actuated. The contact arm 84'' of switch 28 is connected to the contacts 53 of the pressure switch 23 by the lead 82 and contact 86'' is connected to the contact arm 70' of the switch 66 of limit switch 16.

Switch 29 is connected directly across the photocell 9 with the contacts 86''' being a dead contact such that in the normal position, the photocell unit 9 is operatively connected to the transducer 19. Upon predetermined operation of the override motor 25, however, the switch 29 is moved to the alternate position at which time the photocell unit 9 is shorted and operatively disconnected from the transducer winding 64.

The operation of the illustrated embodiment of the invention is summarily described as follows:

The photocell unit 9 is mounted adjacent the ceiling and establishes an output in accordance with the illumination level. The cell unit 9 converts the light level to a proportionate current which in turn is fed to the transducer winding 64 of transducer 19 for throttling or modulating the air pressure fed to the chamber 61 of actuator 54 for pivoting of arms 59 and 59' with respect to the pressure switches 22 and 23, which are set respectively for actuation at predetermined pressure signals. Thus, as previously noted, switch 22 is set such that it is closed at all pressures above 7 p.s.i. where a switch 23 is closed at all pressures below 6 p.s.i. When the pressure is between 6 and 7 p.s.i., both switches will be open holding the motor circuits open and the illumination at the predetermined level.

When the switch 30 is thrown to the automatic position, the interlock relay 51 is energized to close its contacts 53 and shunt the switch 14 for row 7 of lights 4 adjacent the inner wall 3. Row 7 is therefore turned on and maintained on under all lighting conditions.

The circuit as shown has rows 5 and 6 of lamps 4 on and the blind 8 fully open, for example, as may occur during early morning hours.

If the natural lighting increases, the illumination level rises above the desired preset level, the output of the cell 9 and therefore the pressure in line 21 will be proportionately increased and be above the preset 7 p.s.i. for controlling switch 22. At slightly above 7 p.s.i., the arm 59 pivots sufficiently to close switch 22 and thereby connect the motor 10 across power lines 31 and 32 to turn off the lights 4 as follows: beginning line 32, contact arm 46 and contact 48 of switch 30 to the now closed switch 22 to contact arm 39' and contact 40' of switch 13, winding 35 and grounded line 36.

Operation of motor 10 sequentially and in timed spaced relation opens switches 14" and 14' and 14 to turn off the lights 4 in rows 5 and 6. Lights 4 in row 7 remain on as a result of the relay 51. Thus, row 5 is first turned off and motor 10 operates for a short period without further switch operation. If the illumination level is now proper, the output of cell 9 decreases the pressure signal to chamber 61 which contracts and pivots arm 59 counterclockwise and opens switch 22 whereupon motor 10 is de-energized.

If the motor 10 is energized to turn off all of the lights 4, the switches 12 and 13 are also driven to the opposite position, breaking the circuit to motor winding 35 and completing a circuit to blind motor 11, if illumination is still excessive, as follows: beginning with power line 32, contact arm 46 and contact 48 of switch 30, now closed switch 22, contact arm 39' and contact 41' of switch 13, lead 80 to contacts 86' and 84' of switch 27 in unit 18, lead 79, contact arm 70 and contact 72 of limit switch 65, closing winding 67 of motor 11 and grounded line 69. Motor 11 begins to close blind 8 until the illumination level drops to the desired level and switch 22 opens to break the above circuit.

As the blind 8 closes, rods 77 and 77' in limit switches 15 and 16 move to the left. Actuator 73 is held by spring 78 in the normal position shown. Actuator 73' however is moved to the left by spring 78' and reverses the position of switch 66 to connect the contact arm 70' to contact 71' which is connected to the blind opening winding 68 of motor 11.

If the illumination level now decreases below the control point and as a result the output signal from the cell 9 actuates the device 63 to create a relatively low pressure signal to the chamber 61, arm 59' pivots clockwise and switch 23 closes. This will complete the circuit to the winding 68 of the blind motor 11 as follows: beginning with power line 32, contact arm 46 and contact 48 of switch 30, now closed switch 23, lead 82, contact arm 84" and contact 86" of switch 28 in unit 18, lead 81, contact arm 70' and the now engaged contact 71' of limit switch 66, the blind 8 being partially closed, to winding 68 and grounded line 69. The motor 11 then operates to open the blind 8 resulting in increased illumination as a result of the natural lighting and an increased output signal of cell 9. The device 63 progressively increases the pressure output signal at line 21 and therefore the signal applied to the chamber 61. As the pressure increases, the arm 59' pivots counterclockwise and at a pressure slightly above 6 p.s.i. the switch 23 opens. As a result, the above circuit is broken and the system is in the dead or null zone with the pressure between 6 and 7 p.s.i. and both switches 22 and 23 opened.

If in the latter system, motor 11 is actuated to completely open the blind 8 and there is still insufficient daylight to reduce the pressure into the dead zone, the continued excessive pressure holds switch 23 closed but the operating circuit is switched to energize motor 10 through the operation of the switch 66 in limit switch 16. When blind 8 is fully open, the rod 77' has moved to the extreme right position and opens the circuit to opening winding 68 and connecting arm 70' to contact 72'. This completes a circuit to the lamp switch motor 10 and results in a rotation of that motor in the lamp-on direction, as follows: beginning with power line 32, switch 30, switch 23, lead 82, switch 28, contact 70', contacts 72', lead 83, contact arm 39 and contact 41 of switch 12, lead 37, winding 34 and grounded line 36. Motor 10 then operates to sequentially close the switches 14, 14' and 14" and turn on the corresponding lamps 4 until the illumination level increases sufficiently to increase the pressure above 6 p.s.i. and into the dead zone at which time switch 23 opens and breaks the above circuit to the motor 11.

Thus, under normal operation, the dead zone corresponds to a predetermined illumination level within the room 1 and if such intensity or level varies above or below the desired band width, the controller initiates appropriate action to reverse the illumination until the desired level falls within the band width or the dead zone. Generally, the desired level will be set to provide an intermediate pressure such as the 6½ p.s.i. suggested in the previous description, when all of the room lights are on and the blind is closed.

If during the day, the natural lighting increases substantially to the point where the solar or radiant heating effect thereof reaches a predetermined level, such as to cause discomfort or an abnormal load on an air conditioning unit, not shown, within the room 1, the output of the solar cell 17 increases to a point which triggers the override heat control unit 18 and in particular energizes the relay winding 90 of relay 89. As a result, the relay contact arm 91 disengages contact 92 and engages contact 93 completing the circuit to the motor 25 as follows: beginning with the power line 32 through the optimize switch 88, contact arm 91 and contact 93 of relay 87, normally engaged contact 86 and contact arm 84 of the switch 26, to motor 25 and the grounded line 87. The motor 25 is thereby energized and begins a cycle of operation. The motor 25 drives the coupling, not shown, to the respective contact arms 84 of switches 26 through 29, inclusive. The motor 25 during the initial cycle moves the contact arms 84' and 84" from the normally engaged contacts 86' and 86" into engagement with the normally disengaged or open contacts 85' and 85". As a result, the switch 27 interconnects the hot power line 32 to the limit switch 15 and completes the circuit to the blind motor 11, as follows: starting with the line 32, contact arm 45 and contact 47 of the on-off switch 30, lead 100, the normally disengaged contact 85' and contact arm 84' of switch 27, lead 79, contact arm 70 and contact 72 of the limit switch 65, closing winding 68 of motor 11 and the grounded line 69. The blind motor 11 is actuated to close the blind 8 and then stop as a result of the opening of the limit switch 65. The switch 28 is actuated by motor 24 to move contact arm 84" from contact 86" and thereby break the interlocking circuit connection to contact 71' of limit switch 16. Arm 84" engages contact 85" and connects switch 23 directly to the switch 12 for turning lights 4 on when the illumination decreases and the switch 23 is closed.

During this period, the switch 26 is maintained in the full line position. After a predetermined time somewhat greater than that required to fully close the blind 8, the motor 25 moves the contact arm 84 from the contact 86 into engagement with the contact 85 and thereby breaks the circuit to the motor 25 and holds the switches 26 through 29 in the respective actuated position with switch 29 in the original position.

During the closing of the blind 8, the illumination within the room 1 is reduced in accordance with the closing rate. Cell 9 creates a reduced output signal which reduces the pressure signal and closes switch 23 and all lights 4 turned on. The system will be maintained in the predetermined position with all of the lights on to maintain the desired illumination as long as the solar heating effect is maintained at a predetermined undesirable level.

When the radiant level of the natural lighting is reduced by a predetermined amount; for example, one-half that of which causes pulling in of the relay 89, the relay 89 will drop out. This returns the relay contact arm 91 to the original position engaging contact 92. In this position, a circuit is now completed to the motor 25 through the contact arm 84 and contact 85 of switch 26 which has been placed into the alternate position by the initial cyclic operation of the motor 25. As a result, the motor 25 again completes a second cycle of operation during which time the switches 26–28 are returned to the normal position and thereby return control back to the normal illumination control and stop motor 25.

In returning to the normal illumination control however, it should be noted that with all of the lights 4 on, the illumination level control unit 10 will be in the dead zone and completely satisfied.

To return control to the illumination level control system during the second cycle of motor 25, switch 29 is actuated to move its contact arm 84''' from engagement with the dead contact into engagement with the normally opened or disengaged contact 86''' and thereby creating a direct short circuit across the cell 9. As a result, the output of the cell 9 to the electropneumatic device 63 decreases to zero and the latter is actuated to provide a minimum signal to chamber 61 which contracts. Arm 59' pivots clockwise and closes switch 23. This will complete the circuit to blind opening winding 68 through switch 28 of unit 18 and switch 66 of limit switch 16, the latter switch being in the alternate position of that shown when the blind 8 is partially or fully closed. The opening of the blind 8 increases the illumination.

The second motor cycle is selected to be about one minute. The cell 9 is shorted for a sufficient period to allow the blind 8 to move to the fully open position after which the switch 29 is released and returns to the normal open position illustrated, thereby operatively reconnecting the photocell 9 to the transducer 19.

The illumination level control will then find itself in complete control but with all the lights 4 on and the blind 8 wide open. In this temporary condition, the illumination level or intensity in the room 1 is excessive. As a result, the output of cell 9 will trigger the control and particularly switch 22 to begin turning off the lights 4 and even partially closing the blind 8, if necessary, as previously described. Full automatic control is thereby restored and will remain so as long as the heating effect of the natural lighting does not exceed the predetermined preset level.

The blind 8 can also be manually closed whenever desired even though the normal control unit would place them in an open position, for example, during the late evening or night by placing of switch 88 in the closed blind position with contact arm 94 engaging contact 98. This completes a circuit to motor 25 through switch 26 to position switches 27 and 28 in the alternate position shown in full in FIG. 2 and close blind 8 as previously described.

Additionally, a manually operated blind open switch 102 in the control unit 18 is connected in parallel with cell 17. When switch 102 is closed, cell 17 is shorted and operatively disconnected from relay 89 and unit 18 cannot interrupt the circuit of blind motor 11 as previously described. The blind 8 will therefore be opened and closed only by the illumination control. This would normally be desirable during winter and the like where full solar heating is preferred.

The switch 26 for cyclically actuating motor 25 in FIG. 2 establishes the motor energizing circuit through contact 86 when relay 89 is energized. The relay 89 may drop out during a cycle if a cloud or other means shades the cell 17 and reduces the output sufficiently. Suitable means such as the circuit of FIG. 3 are preferably provided to insure completion of a cycle once initiated.

Referring to FIG. 3, a portion of the energizing circuit between motor 25 and relay 89 is shown wherein switch 26 is replaced with a pair of cycle control switches 103 and 104 of a similar structure. Switch 103 is described with corresponding elements of switch 104 similarly primed.

Switch 103 includes a switch arm 105 normally engaging a contact 106. A tear-drop shaped cam 107 is coupled to be rotated by motor 25. In the standby position prior to energization of relay 89, cam 107 is positioned with the tip thereof facing away from arm 105. Motor 25 during a first cycle rotates cam 107 through 180 degrees such that the tip thereof engages and moves arm 105 from contact 106.

Switch 104 is similarly actuated by a cam 107' which is angularly arranged 180 degrees with respect to cam 107. Switch 104 is therefore held open in the standby position of unit 18.

The contact arms 105 and 105' are connected to motor 25. The contacts 106 and 106' are connected respectively to contacts 92 and 93 of relay 89 to establish a pair of energizing circuits similar to that of contacts 85 and 86 in FIG. 2.

In operation, when relay 89 is energized as a result of the signal from cell 17 to unit 18, relay arm 91 moves to the alternate position and motor 25 is energized through the circuit of switch 103. Motor 25 rotates to actuate control switches as described with respect to FIG. 2. Switch 103 remains in the illustrated position until the end of the first cycle and then opens as a result of engagement between cam 107 and arm 105.

Cam 107' is also rotated and immediately releases arm 105' to close switch 104. If the relay 89 releases during the cycle, the relay arm 91 reverts to the original position. This completes the alternate energizing circuit for motor 25. This circuit is maintained until cam 107' rotates 360 degrees to break the circuit.

If during the latter motor energizing circuit, relay 89 is again energized, the control of motor 25 is returned to switch 103 and the cam 107.

In the modification of FIG. 3 therefore, motor 25 is always driven to the end of a cycle to properly position control switches 27, 28 and 29.

Although illustrated in connection with the specific illumination controller, the present invention is obviously adapted for any illumination control system wherein the illumination control is not directly dependent on the illumination effect of the natural lighting only. It is particularly adapted for incorporation with a combination blind or other shade means and lamp control system such as described above.

The present invention thus provides an optimizing control means for illumination control assemblies and devices which can be built as a separate unit and wired into any other systems or can be directly incorporated or integrated into an illumination control system. The control of the present invention allows use of the natural lighting whenever the illumination effects are not outweighed by the undesirable heating effects of the natural lighting.

Various modes of carrying out the invention are contemplated as being within the scope of the following claims particularly pointing out and distinctly claiming the subject matter which is regarded as the invention.

We claim:

1. In an illumination solar heat controller for controlling the natural and artificial lighting of a room having a window to admit natural light with a mechanically actuated shade for the window and having artificial lighting means,
   (a) motor means for proportionately opening and closing the shade and for proportionately actuating the artificial lighting means to establish a predetermined level of illumination,
   (b) illumination control means responsive to the light intensity in the room and having switch means to selectively actuate the motor means to control the artificial lighting means and the shade to maintain a predetermined light intensity in the room,
   (c) a solar cell disposed between the shade and the window and establishing an output in proportion to the solar energy of the natural light, and
   (d) a solar control unit having switch means in said illumination control means nad selectively positioned to enable and disable the control of the shade by said illumination control means and to close the shade when in a disabling position, said control unit including cyclically operable means connected to said solar cell and controlled thereby for actuating said switch means in accordance with the heating effect of the natural lighting.

2. In an illumination-solar heat controller for controlling the natural and artificial lighting of a room having a window means for admitting natural light and light interrupting means for covering the window means and having interior artificial lighting means,
   (a) illumination control means including a first circuit for sequentially actuating said light interrupting means and said artificial lighting means in proportion to increasing of the illumination level from a selected level and a second circuit for sequentially actuating said artificial lighting means and said light interrupting means in proportion to decreasing deviation of the illumination level from said selected level,
   (b) illumination sensing means for alternately and selectively conditioning said circuits in accordance with the illumination intensity in the room,
   (c) heat control means including switch means in each of said circuits and actuable to disconnect the light interrupting means from said circuits while maintaining them to actuate said artificial lighting means, actuation of said switch means actuating said light interrupting means to cover the window,
   (d) a heat sensitive means disposed exteriorly of the light interrupting means and establishing an electrical signal proportional to the heating effect of the natural lighting, and
   (e) switch positioning means connected to said heat sensitive means and coupled to said switch means to actuate said switch means in response to a selected electrical signal and releasing said switch means in response to selected reduction in said signal.

3. The illumination-solar heat controller of claim 2, wherein,
   (a) said switch positioning means includes a motor coupled to the switch means,
   (b) cycle control switch means coupled to said motor and connected in a pair of paralleled energizing circuits for said motor, one of said circuits constituting a standby circuit being closed by the switch means and the opposite circuit constituting an actuated circuit opened by the switch means, and
   (c) electrically responsive means connected to said heat sensitive means and alternately conditioning said energizing circuits for said motor in response to the electrical signal from the heat sensitive means, said actuated circuit being normally conditioned and said standby circuit being conditioned in response to actuation of the electrically responsive means.

4. The illumination-solar heat controller of claim 2 wherein said switch means includes,
   (a) a first switch means connected in said second circuit and having a first normal position conditioning said second circuit for energization and a second position establishing an independent circuit for actuating said light interrupting means to a closed position,
   (b) a second switch means connected in said first circuit and having a first position conditioning said first circuit for energization and a second position disconnecting the light interrupting means from the first circuit and establishing a separate circuit for said artificial lighting means, and
   (c) a third switch means connected to said illumination sensing means and having a first position conditioning said sensing means for normal operation and a second position for simulating a predetermined decreased illumination intensity.

5. In an illumination-solar heat controller for controlling the natural and artificial lighting of a room having a window means for admitting natural light and light interrupting means for covering the window means and having interior artificial lighting means,
   (a) illumination control means including a first circuit for sequentially actuating said light interrupting means and said artificial lighting means and a second circuit for sequentially actuating said artificial lighting means and said light interrupting means,
   (b) illumination sensing means for alternately and selectively conditioning said circuits in accordance with the illumination intensity in the room,
   (c) heat control means including switch means in each of said circuits and actuable to disconnect the light interrupting means from said circuits while maintaining them to actuate said artificial lighting means, actuation of said switch means actuating said light interrupting means to cover the window,
   (d) a heat sensitive means disposed exteriorly of the light interrupting means and establishing an electrical signal proportional to the heating effect of the natural lighting,
   (e) a first cycle control switch connected in a first energizing circuit for said motor for one cycle of motor operation,
   (f) switch positioning means to open said first cycle control switch at the end of the cycle,
   (g) a second cycle control switch connected in a second energizing circuit for said motor for a second cycle of motor operation,
   (h) switch positioning means holding the second cycle control switch open and operable to close the same during the first cycle of operation and open the same at the end of said second cycle of motor operation,
   (i) means coupling said switch positioning means to said motor, and
   (j) electrically responsive switch means connected to said heat sensitive means and having a first standby position for connecting said second energizing circuit to a power line and a second actuated position for connecting said first energizing circuit to a power line.

6. The illumination-solar heat controller of claim 2 wherein said heat control means and said switch positioning means includes, (a) a switch motor adapted to be driven through a first and a second cycle, (b) a first switch means connected in said second circuit and having a first normal position conditioning said second circuit for energization and a second position establishing an independent circuit for actuating said light interrupting means to a closed position and being coupled to be positioned by said motor, (c) a second switch means connected in said first circuit and having a first position conditioning said first circuit for energization and a second position disconnecting the light interrupting means from the first circuit and establishing a separate circuit for said artificial lighting means and being coupled to be positioned by said motor, (d) a third switch means connected to said illumination sensing means and having a first position conditioning said sensing means for normal operation and a second position for simulating a predetermined decreased illumination intensity and being coupled to be positioned by said motor, (e) a pair of cycle control switches connected in a pair of energizing circuits for said motor, (f) electrically responsive switch means connected to said heat sensitive means and having a first normal position for connecting one of said energizing circuits to a power input line and second actuated position for connecting the second of said energizing circuits to the power input line, and (g) means coupled in driven relationship to said motor and in driving relationship to said pair of cycle control switches and initially establishing the switch in the second of said energizing circuits closed and the switch in the first of said energizing circuits open, said motor driving said means in response to actuation of said switch means to immediately close the open switch and after a predetermined period to open the closed switch and to thereafter reverse the sequential actuation of the control switches and thereby establish a pair of motor cycles.

7. The controller of claim 6 having, (a) a manually operable switch connected to the input side of the said electrically responsive switch means and having a first position serially connected in circuit therewith and a second position connected in parallel therewith for manually controlling said motor, and (b) a manually operable switch connected in circuit with the heat sensitive means and the electrically responsive switch means to selectively operably disconnect the heat sensitive means from the switch means.

8. In an illumination-solar heat controller for a room having a natural lighting window and a plurality of artificial lighting means, (a) a window shading means for selective covering of the window to reduce the natural lighting, (b) first motor means for actuating said shading means, (c) switch means for actuating said artificial lighting means, (d) second motor means for actuating said switch means, (e) a cell within the room level for sensing the illumination level and establishing a proportionate output, (f) illumination level control means including switch means connected in an energizing circuit with the first motor means and second switch means connected in an energizing circuit with the second motor means, said switches being respectively actuated by a cell output below a predetermined level and by an output above that level, (g) heat control switch means including a first switch means connecting the first motor means in said energizing circuit and in an independent energizing circuit, a second switch means connecting said second motor means in said energizing circuit and a third switch means operative to open the shading means, (h) a solar energy cell disposed exteriorly of the shading means for sensing the solar heating effect of the natural lighting, and (i) electroresponsive means connected to the solar energy cell for positioning the control switch means in accordance with predetermined solar heating effects.

9. In an illumination control system for a room having a window and a plurality of light means, (a) a window shading means for selective covering of the window, (b) first motor means having a shade opening winding and a shade closing winding for actuating the shading means, (c) switch means for controlling said light means, (d) second motor means having a light-on winding and a light-off winding for actuating said switch means, (e) a signal generating means responsive to the illumination level in the room and establishing a pressure signal proportional to the illumination intensity in the room, (f) a first motor energizing circuit including a high-pressure switch connected in an energizing circuit for said first and second motor means, (g) a second motor energizing circuit including a low-pressure switch connected in an energizing circuit with first and second motor means, (h) means coupling said signal generating means to said pressure switches, (i) a signal generating means disposed exteriorly of the shading means and establishing a signal proportional to the heat energy of the natural light striking the window, (j) switch means connected in said energizing circuits and having a position disconnecting said first motor means from the corresponding energizing circuit, and (k) means connecting said last-named switch means to said second-named signal generating means.

10. An illumination-solar heat controller for a room having window means selectively covered by a shade means and artificial lighting means dispersed throughout the room, (a) electrically responsive control means to vary the artificial lighting means, (b) electrically responsive shade control means to vary the position of the shade means and thereby vary the natural lighting, (c) a first control circuit for said control means to sequentially reduce the artificial lighting to a minimum and thereafter close the shade means, (d) a second control circuit for said control means to sequentially open the shade means and thereafter increase the artificial lighting, (e) a light sensitive cell connected to actuate said control circuits, (f) a solar heat motor, (g) a bank of four switch means coupled to said heat control motor including a motor control switch means, a shade closing switch means, a shade motor disconnect switch means and a cell disconnect switch means; said shade closing switch means having a contact arm selectively engaging a standby contact and an actuated contact, said contact arm and said standby contact being connected in said first control circuit to connect the shade control means therein and said actuated contact being connected to a source of power for disconnecting the shade control means from the first control circuit and connecting it in an independent energizing circuit upon actuation of the shade closing switch means; said motor disconnect switch means having a contact arm alternatively engaging a standby contact and an actuated contact and being connected in said second control circuit and connecting said shade control means therein in the standby position and disconnecting the shade control means therefrom in the actuated position; said cell disconnect switch means having a contact arm and an actuated contact connected to the cell means to operably disconnect the cell means; said motor control switch means having a standby contact and an actuated contact and movable contact means selectively engaging the associated contacts in response to operation of the motor, (h) a relay having a contact arm engaging a standby contact when the relay is de-energized and an actuated contact when the relay is energized, said contacts being connected one each to the opposite contacts of the motor control switch, (i) an optimize switch having a contact arm for connection to a power source and manually actuated to alternately engage an optimize contact connected to the contact arm of the relay and a blind close contact connected to the standby contact of the motor control switch, (j) a solar cell mounted between the window and the shade means and generating a signal proportional to the heating level of the natural lighting, said solar cell being connected to said relay, and (k) switch means to operably disconnect the solar cell from said relay.

11. An illumination-solar heat controller for a room having an exterior wall of windows selectively covered by a shade means and a plurality of lights within the room, (a) a reversible light control motor means, (b) a stepping switch bank having light control switch means for said lights and motor control switch means connected to control the direction and extent of the motor operation, (c) a reversible shade control motor means, (d) limit switch means coupled to the shade control motor for controlling the direction and extent of the motor operation, (e) level switch means having a plurality of circuit positions, (f) cell means for sensing the illumination in the room and actuating the switch means in one position when the illumination reaches a predetermined level and actuating the switch means in a second position when the illumination reaches a second predetermined level less than said first predetermined level, (g) motor energizing circuits having a first circuit path including the light control motor means with the corresponding motor control switch means and said level switch means, said limit switch means and said shade control motor means for sequentially turning off said lights and closing said shade means in response to the first position of the level switch means and a second circuit path including the light control motor and the associated switch means, said limit switch means, said shade control motor and said level switch means for sequentially opening the shade means and turning on said lights in response to the second position of the level switch means, (h) a solar heat control motor, (i) switch means coupled to said heat control motor including a motor control switch means, a shade closing switch means, a shade motor disconnect switch means and a cell disconnect switch means, said shade closing switch means being connected in said first circuit path and to a source of power and arranged to disconnect the shade control motor means therefrom and connecting the shade control motor means in an independent energizing circuit for closing thereof, said motor disconnect switch means being connected in said second circuit path and arranged to disconnect the shade control motor means therefrom, said cell disconnect switch means having a contact arm and an actuated contact connected to the cell means to operably disconnect the cell means, (j) an electrically actuated means being connected in a heat motor energizing circuit with the motor control switch means to provide cyclical actuation thereof, (k) an optimize switch connected in said heat motor energizing circuit and having a first position connected directly to the motor control switch means and a second position connected to said electrically actuated means, and (l) a solar cell mounted between the window and the shade means and generating a signal proportional to the heating level of the natural lighting, said solar cell being connected to said electrically actuated means for energizing said heat control motor means in response to predetermined variation of the heating level from a selected level.

12. An illumination-solar heat controller for a room having an exterior wall of windows selectively covered by a shade means and a plurality of rows of lights parallel to the windows and laterally spaced therefrom, (a) a reversible light control motor having an on winding and an off winding connected in common at one end and each having an input end, (b) a stepping switch bank coupled to said light control motor and having a switch for each row and sequentially actuating said rows of lights with the innermost row turned on first and the outermost row turned on last and a pair of motor control switches connected respectively one each to the input end of said windings, (c) a reversible shade control motor coupled to the shade means and having an opening winding and a closing winding connected in common at one end and each having an input end, (d) a pair of limit switches coupled to the shade control motor, each of said limit switches having a normal position and a first of said limit switches having an alternate position only when the shade means is fully closed and the second of said limit switches having an alternate position only when the shade means is fully open, (e) an upper level switch, (f) a lower level switch, (g) cell means for sensing the illumination in the room and actuating the upper level switch when the illumination reaches a predetermined level and actuating the lower level switch when the illumination reaches a second predetermined level less than said first predetermined level, (h) a first motor energizing circuit including said off winding of the light control motor in series with the corresponding motor control switch and said upper level switch and said first limit switch and said closing winding of the shade control motor for sequentially turning off said lights and thereafter closing said shade means in response to closing of the upper level switch, (i) a second motor energizing circuit including said on winding of the light control motor and said second limit switch and said opening winding of said shade control motor and said lower level switch for sequentially opening the shade means and thereafter turning on said lights in response to closing of the lower level switch, (j) a solar heat control motor, (k) a bank of four switches coupled to said heat control motor including a pair of motor control switches, a shade closing switch, a shade motor disconnect switch and a cell disconnect switch; said shade closing switch having a contact arm selectively engaging a standby contact and an actuated contact, said contact arm and said standby contact being connected in said first motor energizing circuit and said actuated contact being connected to a source of power and arranged to disconnect the closing winding from the first motor energizing circuit and connecting the closing winding in an independent energizing circuit when actuated, said motor disconnect switch having a contact arm alternately engaging a standby contact and an actuated contact and being connected in said second motor energizing circuit and arranged to disconnect the opening winding of the shade control motor from the second motor energizing circuit when actuated, said cell disconnect switch having a contact arm and an actuated contact connected to the cell means to operably disconnect the cell means, said pair of motor control switches each having a contact and a contact arm, said contact arms being connected to the heat control motor and engaging the associated contact and being disengaged therefrom in response to cyclical operation of the motor, (l) a relay having a contact arm engaging a standby contact when the relay is de-energized and an actuated contact when the relay is energized, said standby and actuated contacts being connected one each to the opposite contacts of the pair of motor control switches, (m) an optimize switch having a contact arm for connection to a power source and manually actuated to alternately engage an optimize contact connected to the contact arm of the relay and a blind close contact connected to a standby contact of the pair of motor control switches, (n) a solar cell mounted between the window and the shade means and generating a signal proportional to the heating level of the natural lighting, said solar cell being connected to said relay, and (o) switch means to operably disconnect the solar cell from said relay.

13. A solar heat controller for connection to an illumination control unit for automatically controlling a natural lighting shade means, (a) a solar heat motor, (b) switch means coupled to said heat control motor including a motor control switch means connected in an energizing circuit for the motor, a pair of shade control switch means for connection to the illumination control unit to disconnect the shade means therefrom and to actuate the shade means to a light intercepting position, and a reset switch means for connection to the light sensing means to momentarily operatively disconnect the same, (c) an electrically actuated means connected in said energizing circuit, (d) an optimize switch in said energizing circuit having a first position bypassing said electrically actuated means and an alternate position serially connected to said electrically actuated means, and (e) a solar cell mounted to intercept a portion of the natural lighting and generating a signal proportional to the heating level of the natural lighting, said solar cell being connected to said electrically actuated means.

14. The controller of claim 13 having switch means to operably disconnect the solar cell from said electrically actuated means.

15. In an illumination-solar heat controller for controlling the natural and artificial lighting of a room having a window means to admit natural light with a means to close the window means against passage of light and having artificial lighting means, (a) illumination control means responsive to the light intensity in the room to actuate the means to close the window means and the artificial lighting means, (b) solar heat responsive means disposed exteriorly of the means to close the window means and generating an output in accordance with the solar energy level of the natural light, and (c) heat responsive control means actuated by said solar heat responsive means and including means connected to the illumination control means to close the window means to eliminate natural lighting in response to a predetermined level of solar energy and means to disconnect said illumination control from the means to close the window means until the solar energy level drops below said predetermined level.

16. The illumination-solar heat controller of claim 15 including an override control means connected to the heat responsive control means and operable to disconnect the heat responsive control means when maximum solar heating is desired.

References Cited

UNITED STATES PATENTS

| | | | |
|---|---|---|---|
| 2,083,726 | 6/1937 | Mason | 156—28 |
| 2,316,309 | 4/1943 | Blain | 268—123 |
| 3,128,384 | 4/1964 | Nelson et al. | 250—205 |
| 3,236,290 | 2/1966 | Lueder | 250—229 |

RALPH G. NILSON, *Primary Examiner.*

WALTER STOLWEIN, *Examiner.*

M. ABRAMSON, *Assistant Examiner.*